July 30, 1968     J. G. DOUGHERTY, JR., ET AL     3,394,583

DOPPLER SHIFT SYSTEMS AND COMPONENTS THEREFOR

Filed Feb. 16, 1965     2 Sheets-Sheet 1

INVENTORS
JAMES G. DOUGHERTY, Jr. &
DONALD S. MOSELEY
BY Brumbaugh, Free,
Graves & Donohue their     ATTORNEYS July 30, 1968   J. G. DOUGHERTY, JR., ET AL   3,394,583
DOPPLER SHIFT SYSTEMS AND COMPONENTS THEREFOR
Filed Feb. 16, 1965   2 Sheets-Sheet 2

INVENTORS.
JAMES G. DOUGHERTY, Jr. &
DONALD S. MOSELEY
BY Brumbaugh, Free,
Graves & Donohue
their ATTORNEYS

United States Patent Office 3,394,583
Patented July 30, 1968

3,394,583
DOPPLER SHIFT SYSTEMS AND COMPONENTS THEREFOR
James G. Dougherty, Jr., Bethesda, and Donald S. Moseley, Silver Spring, Md., assignors to Vitro Corporation of America, New York, N.Y., a corporation of Delaware
Filed Feb. 16, 1965, Ser. No. 433,016
19 Claims. (Cl. 73—24)

ABSTRACT OF THE DISCLOSURE

Ocean sounding probes in which electroacoustic transmitters and receivers on the probe are cyclically varied in the spacing therebetween to induce a Doppler shift in acoustic waves propagated from the transmitter to the receiver through the ocean water. The Doppler-shifted received signal is processed to yield an indication of the profile with depth of the velocity of sound in the ocean water. Sound velocity may be indicated by a spiral trace on a cathode ray tube. Like systems may be used in other environments to determine other parameters of a fluid medium or the modulation index of an angularly modulated wave.

---

This invention relates to systems (and components therefor) wherein a Doppler shift in the phase or frequency of an acoustic wave in a fluid medium is utilized to determine the value of a parameter of the medium.

According to the invention, at least two electro-acoustic transducer means are immersed in a gaseous or liquid fluid medium to have therebetween a variable length path through the medium. One of the transducer means is transmitter means, and the other thereof is receiver means. The transmitter means is energized by an electric signal of reference frequency and phase and is responsive to such signal to emit into the medium a subsonic, sonic, or supersonic, pulsed or continuous acoustic wave. The emitted wave propagates through the medium over the said path to reach the receiver means and to be converted thereby into a received electric signal. A variation in the length of said path accompanies the operation of the two transducer means. That variation imparts to the wave a Doppler shift in frequency or phase which is manifested as a commensurate change in the frequency or phase of the received signal. Appropriate signal-processing means and output means are utilized to provide an output representative of such phase or frequency change. As explained in more detail hereinafter, the magnitude of the Doppler shift is a function of the velocity of propagation of the wave through the medium. Therefore, the mentioned output is representative of the value of such velocity or of the value of related parameters as, for example, the temperature of a liquid medium or the density of a gaseous medium.

Preferably, the length of the mentioned path is varied in a cyclical manner to render the received signal angularly modulated in the sense that the vector which represents that signal is characterized by an oscillation through an angle relative to the vector representing the transmitter-energizing signal.

The invention has numerous applications. Thus, for example, equipment embodying the invention may be mounted within a container for a fluid medium and may be utilized to monitor a parameter of that medium. Further, components of the system may be employed to determine the modulation index of an angularly modulated wave irrespective of its source. Still, further, the system is adapted to the use of providing an output representative of a change in distance between the transmitter means and the receiver means. For the purpose, however, of best disclosing the invention in various of its aspects, the present invention is described herein in connection with its embodiment in a system for obtaining the profile of the variation with depth of the velocity of sound in ocean water.

For a better understanding of the invention, reference is made to the following description of exemplary embodiments thereof, and to the accompanying drawings wherein.

Figure 1:
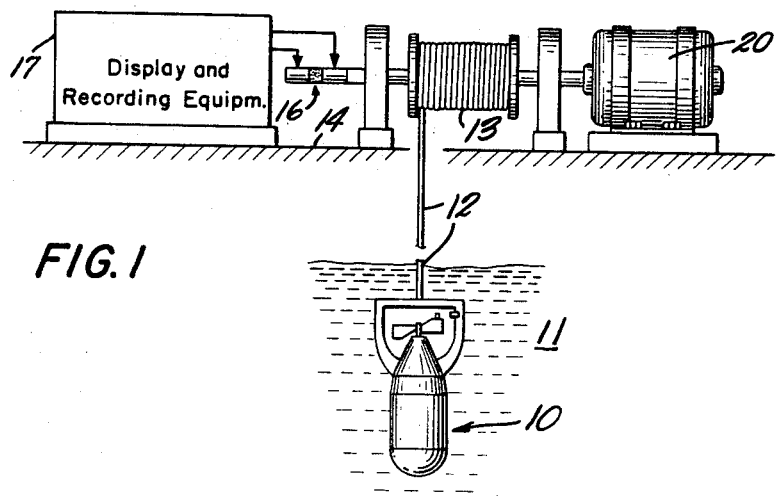
FIGURE 1 is a schematic view in elevation of an ocean-probing sound velocimeter system according to the invention.

Referring now to FIGURE 1, the reference numeral 10 designates an instrument sinkable in the ocean 11 in which the instrument is shown as being immersed. A communication link between instrument 10 and the ocean surface is provided by a cable 12 stored at its upper end on a reel 13 mounted on a platform 14 which may be, say, the deck of a ship. The one or more signals carried by cable 12 are supplied via a brush and slip-ring unit 16 to an output unit 17 containing equipment by which those signals are recorded, displayed, and/or otherwise operated on to make conveniently available the information represented by the signals. In lieu of being at the surface of the ocean, reel 13 may be within instrument 10. Further, cable 12 may be connected at its upper end to a sonobuoy (not shown) which transmits the cable-supplied information by a radio telemetering link to a remote output unit. Still further, while the cable 12 in FIGURE 1 is a two-conductor cable (as indicated by the two slip rings and two brushes of unit 16), one of the conductors in the cable may be eliminated by, say, providing for time sharing of signals on the remaining conductor. When appropriate, the communication link between instrument 10 and the ocean surface may be provided by a radio link or by an acoustic link instead of by a cable.

Reel 13 is shown in FIGURE 1 as being rotatable by a motor 20 adapted to pay out and take in the cable 12 while the ship is either stationary or in motion. In instances, however (particularly in the cases of a deep sounding by instrument 10 or of high speed accompanying an instrument lowering), retrieval of the instrument is impractical because of its excessive drag, the long time required to haul the instrument up or in, the extra cable strength needed to permit retrieval and other considerations. In those instances, therefore (and, preferably, in most instances) motor 20 and reel 13 are eliminated, cable 12 is paid out freely from a coil thereof, and the instrument 10 after sinking is not retrieved, i.e., is expendable.

Figure 2:
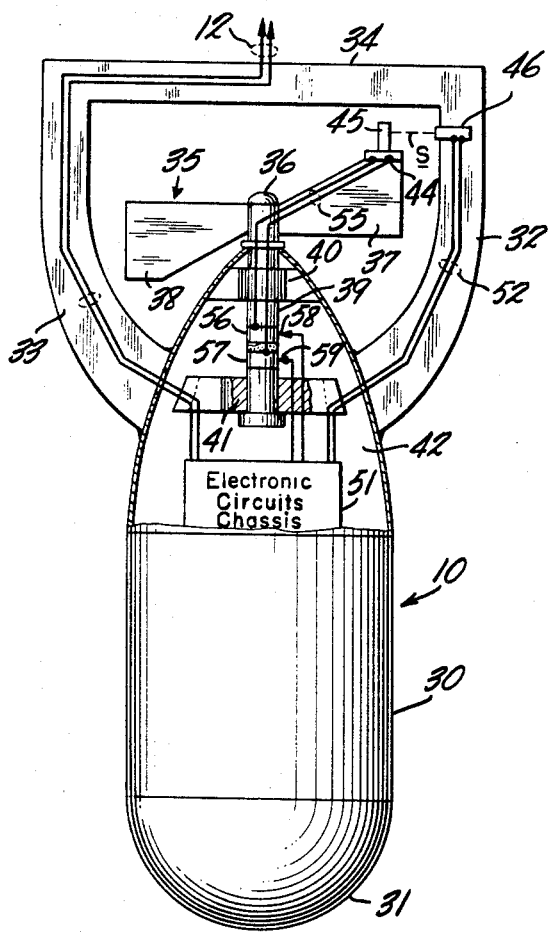
FIGURE 2 is an enlarged view in elevation of the probe means of FIGURE 1.

Referring now to FIGURE 2, the probe means of instrument 10 comprises a streamlined cylindrical sinker body 30 having a weighted head 31 and a pair of oppositely disposed posterior fins 32, 33 extending rearwardly from body 30 to a strut 34 by which the back end of the fins are joined together. Disposed in the space between strut 34 and body 30 is a propeller 35 having a plurality of vanes angularly distributed around a central hub 36. Element 35 may be, for example, a three-vane propeller, but, for convenience of illustration, only two vanes 37 and 38 are shown.

The propeller hub 36 is mounted on a shaft 39 supported by appropriate bearing means which are not shown in detail, but which are represented schematically in FIGURE 2 by the elements 40 and 41 disposed within a hollow interior space 42 in the rear part of sinker body 30. The mode of bearing support of shaft 39 is such that propeller 35 is a freely rotatable or wind-milling propeller. That is, the sinking in the ocean of instrument 10 produces an upward flow of water relative to and past vanes 37 and 38, and that flow in turn acts on the propeller vanes to rotate the propeller in a manner analogous to the rotation of the vanes of a windmill by a flow of air. As confirmed by the teachings in the article by H. M. Hochreiter entitled "Dimensionless Correlation of Coefficients of Turbine-Type Flow Meters," appearing in the Transactions of the A.S.M.E., vol. 80, pp. 1363–1368 (1958), the rotation rate of the wind-milling propeller 35 is directly proportional to the vertical rate of sinking of instrument 10, the value of the proportionality constant being determined by calibration. Hence, the depth to which the instrument has sunk at any time is determinable at the output unit 17 by supplying to that unit a signal indicative of the number of revolutions to that time of the propeller, and by thereafter multiplying such number by the previously ascertained proportionality constant.

As shown, the vane 37 has a radially outward upper edge 44 which is raised relative to the upper edge of vane 38. Mounted on edge 44 and projecting upwardly therefrom is a first electroacoustic transducer 45 rotatable with propeller 35 to follow an orbital path 75 (FIG. 3) extending in a full circle around the axis of the propeller. Supported by instrument 10 in spaced relation from transducer 45 is a second electroacoustic transducer 46 separated from element 45 by a wave propagation path $s$ which is unobstructed for all angles assumed by element 45 in the course of its rotation. Preferably, the stationary transducer 46 is outside the path $s$ of travel of movable transducer 45 and is in the same plane as path $s$. To this end, the stationary transducer may be mounted as shown on fin 32.

One and the other of the two transducers are, respectively, an electroacoustic transmitter head and an electroacoustic receiver head, the stationary transducer preferably being the transmitter. In FIG. 2, the elements 45 and 46 are, respectively, the receiver and the transmitter. The receiver 45 has an omnidirectional uniform acoustic wave reception pattern, and the transmitter 46 has an acoustic wave transmission pattern providing uniform coverage for all angles swept out by the moving receiver 45. Some further characteristics of transducers 45, 46 and their relationship are (a) the receiver 45 is outside the near field of transmitter 46 when the variable length path $s$ between the transducers is of minimum length, (b) propeller 35 is dimensionally stable in the radial dimension to provide a highly constant diameter for the circular path 75 followed by receiver 45, (c) the windmilling propeller 35 is designed to eliminate or minimize cavitation effects, (d) the speed of travel of receiver 45 through the water is substantially less than Mach 1.

The transmitter 46 is energized to emit acoustic waves by a signal of reference frequency and phase from an oscillator 50 (FIGURE 3) on a chassis 51 (FIGURE 2) in the space 42 within the sinker body 30. The oscillator signal is supplied to the transmitter by a waterproof two-conductor cable 52. Cable 52 passes from chassis 51 through a stuffing box (not shown) in the casing for space 42, the cable thereafter running along the side of fin 32 to the transmitter. Clamps (not shown) are utilized to fasten the cable to the side of the fin.

The waves emitted by transmitter 46 are propagated through the water medium over the path $s$ to be received and converted into an analogous electric signal by the receiver 45. The received signal is fed from the receiver to chassis 51 by a waterproof two-conductor cable 55 running from receiver 45 along the side of vane 37 to shaft 39, the cable being fastened to the vane by clamps (not shown). From vane 37, the cable extends through the interior of shaft 39 past element 40 into space 42 and to a pair of slip rings 56 and 57 of which each is connected to a respective one of the cable conductors. The signal on slip rings 56 and 57 is transmitted to chassis 51 through a pair of brushes 58 and 59 of which each contacts a respective one of said rings, both brushes being connected to the chassis. Water is prevented from entering space 42 by element 40 which acts as a seal for such space and as a stuffing gland for the shaft 39. The described mode of connecting the signal from a rotating transducer 45 to stationary chassis 51 is by way of example since other rotating-to-stationary connection means may be employed for the same purpose.

Figure 3:
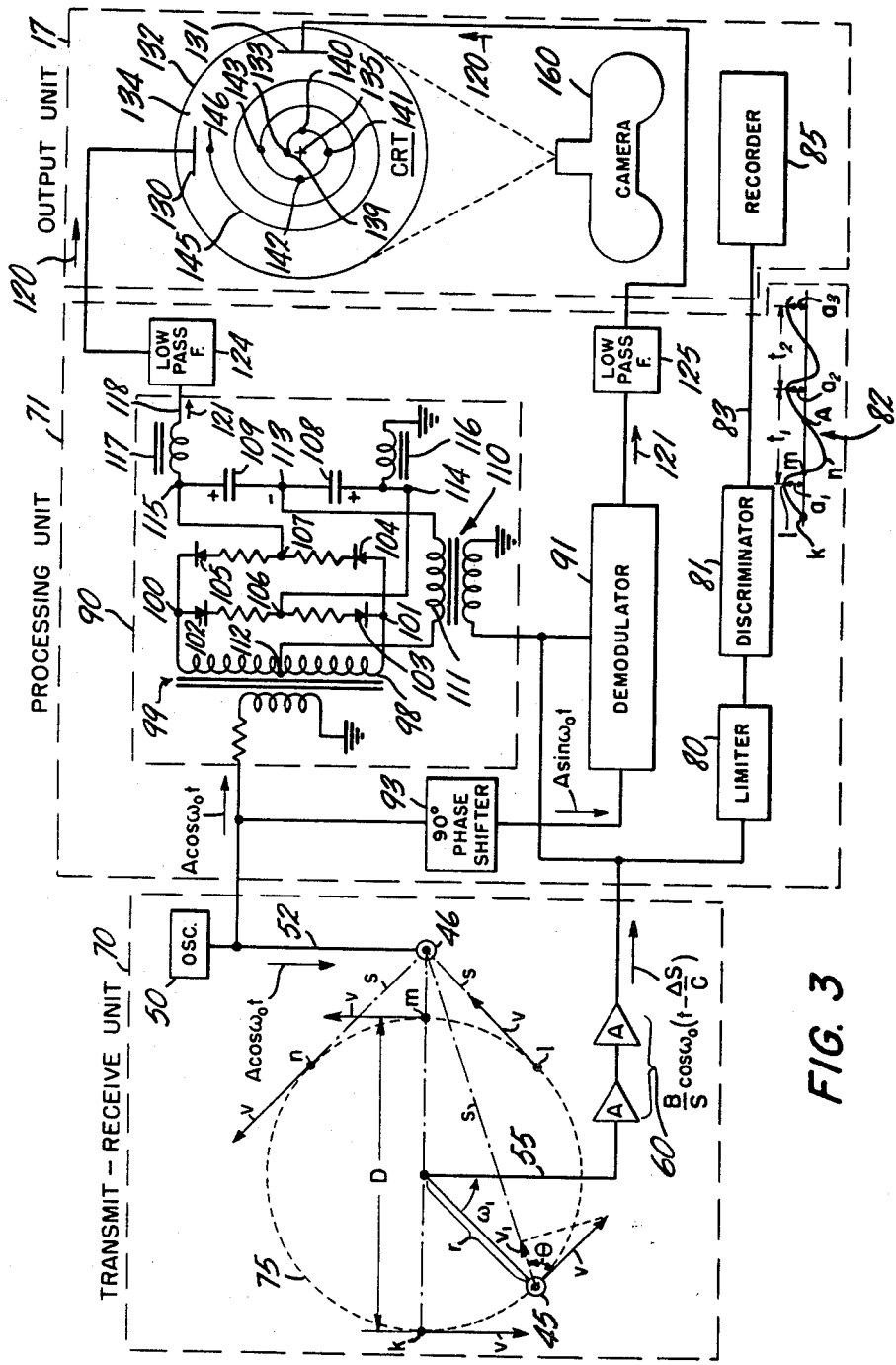
FIGURE 3 is a schematic view of the electronic components of the system of FIGURE 1.

Within chassis 51, the receiver signal is amplified by an amplifier chain 60 (FIGURE 3). Moreover, the received signal may be further processed (as later described) within chassis 51 itself by appropriate electronic circuits.

The one or more outputs from chassis 51 are transmitted by the cable 12 to the surface of the ocean. As shown, the lower end of cable 12 passes from chassis 51 through the casing of space 42 (by way of an unshown stuffing tube) and then runs along fin 33 and strut 34 to the strut center from which the cable extends upwards. Clamps (not shown) are utilized to fasten the cable 12 to the side of the mentioned fin and strut.

Referring to FIGURE 3, the described system is, electrically speaking, divided into a transmit-receive unit 70 forming part of instrument 10, an output unit 17 remote from instrument 10 (see FIG. 1), and a processing unit 71 which may be incorporated either in the chassis 51 of instrument 10 or be in the remote console which contains output unit 17. In the transmit-receive unit 70, the energizing signal from oscillator 50 (which may be a crystal oscillator) causes the transmitter 46 to emit a train of acoustic waves which are of constant frequency, and which are propagated through the water medium at a velocity $c$ over the path $s$ between the two transducers. Concurrently with the emission of such waves, the sinking of instrument 10 creates for propeller 35 a relative upward flow of water by which the propeller is windmilled to rotate receiver 45 and thereby vary the length of path $s$. Because of such variation in path length, the waves from the transmitter which are intercepted by the receiver are characterized by a Doppler shift productive of an angular modulation or Doppler shift of the signal derived from the waves by the transducer action of the receiver 45. The mentioned Doppler shift can be regarded either as a frequency shift productive of frequency modulation of the received signal or as a phase shift productive of phase modulation of the received signal. Whether the shift is regarded as a frequency shift or a phase shift, the amount of shift is a function of the velocity $c$, and the FIG. 3 system is adapted by one or the other or both of FM processing and PM processing of the received signal to derive from the processing an output which is representative of such velocity.

Considering first the derivation of such an output by FM processing, the peak to peak spacing or wavelength of the waves in the train in path $s$ is equal to $c/f_0$ where $f_0$ is the constant frequency at which these waves are emitted. Receiver 45 is rotated in the shown direction at an angular speed $\omega_1$ so as to have a tangential speed $v$ equal to $\omega_1 r$ where $r$ is the radius of the circular path 75 of the receiver. The speed $v$ has in path $s$ a component $v'$ equal to $\omega_1 r \cos \theta$ where $\theta$ is the angle between $v$ and $s$. In the course of receiving the waves, the speed component $v'$ of receiver 45 is algebraically additive with the velocity $c$ in path $s$ of the train of waves. Therefore, the frequency $f_1$ of interception by receiver 45 of the successive wavelengths of the waves in path $s$ is:

$$f_1 = \frac{c+v'}{\frac{c}{f_0}} \quad (1)$$

or $$f_1 = f_0\left(1 + \frac{\omega_1 r \cos \theta}{c}\right) \quad (2)$$

The Doppler frequency shift $\Delta f$ of the received waves is equal to $f_1-f_0$ and is variable. From expression 2, the Doppler frequency shift is:

$$\Delta f = f_1 - f_0 = f_0\left(\frac{\omega_1 r \cos\theta}{c}\right) \quad (3)$$

When the receiver 45 is at point $k$, $\Delta f$ is zero because $\cos\theta$ is zero. As receiver 45 moves from point $k$ to point $l$ at which $v$ is aligned with path $s$ and $\cos\theta$ equals 1.0, the Doppler frequency shift rises to a positive maximum $\Delta f_{max.}$ attained at point $l$ and given by the expression:

$$\Delta f_{max.} = f_0\frac{\omega_1 r}{c} \quad (4)$$

When the receiver then moves from point $l$ to point $m$, $\Delta f$ declines and returns to zero at point $m$. With further receiver movement from point $m$ to point $n$, $\Delta f$ declines further to a negative maximum approximately or exactly equal in magnitude to the positive maximum previously attained at point $l$. In the course of travel of the receiver from point $n$ back to point $k$, the value of the Doppler frequency shift rises to return at point $k$ to the original value of zero.

Because of the described variable Doppler frequency shift of the waves intercepted by receiver 45, the received signal derived from these waves is a frequency modulated signal characterized by an instantaneous frequency $f_1$, a peak deviation of $\pm\Delta f_{max.}$ about a center frequency $f_0$ and a rate of cyclical deviation equal to the rotation rate of the receiver. The frequency modulation of the signal is accompanied by a cyclical amplitude modulation produced by the inverse variation with the length of the path $s$ of the strength of the received waves. While the repetition rate of the amplitude modulation is equal to the rotation rate of receiver 45 and thus is the same as the deviation rate of the frequency modulation, the amplitude modulation is shifted in time relative to the frequency modulation in that the minimal and maximal values for the AM occur when receiver 45 is at point $k$ and $m$, respectively, whereas the positive and negative maximum values for the instantaneous deviation of the FM occur when receiver 45 is at points $l$ and $n$, respectively.

The received signal is subjected to FM processing by being passed from amplifier chain 60 to processing unit 71 within which the amplitude modulation on the signal is removed or minimized by a limiter stage 80. The limited frequency modulated signal is then converted by a discriminator stage 81 (which may be, say, a Foster-Seely discriminator or a ratio detector) into a demodulated signal 82 characterized by a time variation in amplitude of which the waveform is shown in FIG. 3 below the output lead 83 for the discriminator. If desired, the output of oscillator 50 may be combined with the output of amplifier 60 ahead of limiter 80 to form a frequency difference signal which is subsequently limited and demodulated, or the oscillator output may be combined with the limiter output which is thereafter demodulated by a discriminator of modified type. The demodulated signal from the discriminator is supplied from processing unit 71 to output unit 17 and, within the latter unit, to a high speed recorder 85 by which the demodulated signal is recorded on a photographic strip or other suitable recording medium as a waveform similar to that shown below lead 83.

The illustrated waveform is characterized by successive positive peak amplitudes $a_1$, $a_2$, $a_3$, etc., separated by time intervals $t_1$, $t_2$, etc. Since each peak amplitude is proportional to $K\Delta f_{max.}$ (where $K$ is a constant), and since expression 4 indicates that $\Delta f_{max.}$ is inversely proportional to the sound velocity $c$, the several peak amplitudes of waveform 82 are representative of the sound velocity values encountered in the ocean water by the sinking instrument 10 at the times of occurrence of those peak amplitudes. A correlation between these sound velocity values and the depths at which they occur is readily obtainable from waveform 82 in that each full cycle thereof corresponds to one full revolution of propeller 35 and in that, as described, the total number of propeller revolutions up to a given time is directly proportional to the depth to which instrument 10 has sunk to that time. Specifically, the depth of occurrence of the sound velocity represented by any given peak amplitude in the waveform is determinable by counting the number of cycles occurring in the waveform up to that time and by multiplying such number by a scaling factor ascertained by pre-calibrating propeller 35 to obtain the quantitative relation between its rotation rate and the rate of sinking of instrument 10. Accordingly, the recorded waveform 82 is an output of the described system which is representative of the velocity profile with depth of sound waves in the ocean.

The relationship set out by expression 4 together with knowledge of the value of the constant K permits determination from any peak amplitude of waveform 82 of the absolute velocity $c$ represented by that amplitude providing that the factors $f_0$, $\omega_1$ and $r$ each has a value which is known either because it is pre-ascertained and remains constant while instrument 10 sinks or because information regarding any change in that value is telemetered to the surface. Note in this connection that the time intervals $t_1$, $t_2$ of recorded waveform 82 are directly proportional to the values of $\omega_1$ during those intervals.

In lieu of determining absolute sound velocity, the waveform 82 permits determination of the sound velocity at various depths relative to some standard velocity value in a manner as follows. If expression 4 is differentiated, the result is:

$$\frac{d(\Delta f_{max.})}{dc} = \frac{\omega_1 r}{-c^2} \quad (5)$$

which yields:

$$d(\Delta f_{max.}) = \frac{\omega_1 r}{-c^2}dc \quad (6)$$

Now, when the left and right hand terms of 6 are divided by, respectively, the left and right hand terms of expression 4, the result is:

$$\frac{d(\Delta f_{max.})}{\Delta f_{max.}} = \frac{dc}{-c} \quad (7)$$

Expression 7 indicates that a percentage change in the peak amplitude of waveform 82 is produced by a percentage change of the same magnitude but of opposite sign in the sound velocity. Thus, for example, if the peak amplitude of the waveform decreases 1% from amplitude $a_1$ to amplitude $a_2$, such decrease indicates that the sound velocity corresponding to amplitude $a_2$ is 1% greater than the sound velocity corresponding to amplitude $a_1$. Thus, a profile of absolute sound velocities can be obtained by determining the absolute sound velocity corresponding to a selected one of the peaks of waveform 82, and by then evaluating the other absolute sound velocities in terms of the sizes of the other peaks relative to the selected peak. For example, if the absolute sound velocity corresponding to amplitude peak $a_1$ is determined by computation as being 5,000 feet per second, then a horizontal line labeled "5,000" can be drawn through peak $a_1$, and, in relation to that line, the other peaks $a_2$, $a_3$, etc. form a visual linear plot of absolute (or relative) sound velocity, values greater and less than 5,000 f.p.s. being below and above, respectively, the "5,000" line.

While the output 82 provided by FM processing is advantageous in that it combines indications of sound velocity and of depth in a convenient single record, the output is subject to the limitations that the values obtained are dependent in their accuracy upon the rotation rate $\omega_1$ of receiver 45 and upon the accuracy of resolution of discriminator 81. To provide more precise sound velocity values, the FM processing of the FIG. 3 system is supplemented by or replaced by phase modulation processing through which there is obtained an output which is independent of $\omega_1$ and of which the value is determinable much more exactly than is the discriminator output. Such PM processing is as follows.

In the transmit-receive unit 70, the time waveform of the energizing signal for transmitter 46 is of the form $A \cos \omega_0 t$ where $A$ is a constant representing amplitude, $\omega_0$ is the frequency of the signal in radians per second and $t$ is time. Assume that receiver 45 is initially at point $k$ and is there separated from the transmitter by a length of path $s$ such that $sf_0/c$ equals an integral number $x$ of wavelengths of the emitted wave. In that instance (and assuming that there are no phase shifts elsewhere in the system), the received wave and received signal are in 0° phase relation with the reference phase of the transmitter energizing signal and of the emitted wave.

Now assume that receiver 45 moves from point $k$ towards point $l$. In so moving, the receiver intercepts the emitted waves sooner than if it had remained at point $k$. Hence, relative to the reference phase of the energizing signal, the phase of the received signal undergoes a progressive phase shift which is in the leading direction, and which continues through 360° ($2\pi$ radians) to bring the received signal back into 0° phase relation with the reference phase signal. That 360° shift corresponds to a shortening of the length of path $s$ by one wavelength so that, upon completion of the shift, the receiver 45 is separated from transmitter 46 by $x-1$ wavelengths. Further movement of the receiver produces another 360° phase shift of the received signal in the course of shortening path $s$ from $x-1$ to $x-2$ wavelengths, a subsequent 360° shift in the shortening of path $s$ from $x-2$ to $x-3$ wavelengths, and so on, until the receiver reaches point $m$. In the movement of the receiver from point $k$ to point $m$, the total leading phase shift undergone by the received signal is 360 $f_0D/c$ where D is the diameter of path 75 and $f_0D/c$ is the number of wavelengths in that diameter (such number need not be an integer).

After reaching point $m$, the movement of the receiver has a component in path $s$ in the direction away from transmitter 46. Thus, for the receiver movement from point $m$ to point $k$, the instantaneous phase of the received signal shifts in the lagging direction away from the maximum attained leading phase so as to bring the signal back at point $k$ to its original 0° phase relation with the reference phase. Hence, one full revolution of receiver 45 around its path 75 produces in the received signal one complete cycle of phase deviation in which the instantaneous phase of the signal shifts in one direction from its original reference phase through a number of full 360° changes to a maximum shift of 360 $f_0D/c$ and then shifts in the other direction back to the original reference phase.

Because of the continuous rotation of the receiver, the received signal is characterized by a plurality of phase deviation cycles and is, therefore, a phase modulated signal for which the mentioned reference phase is one of the extremes of the phase deviation of the signal.

Besides being phase-modulated, the received signal is amplitude-modulated because of the inverse variation with the length of path $s$ of the strength of the waves intercepted by the moving receiver. Such wave strength will be minimum and maximum when the receiver is at points $k$ and $m$, respectively. Therefore, the amplitude modulation of the received signal is coincident in time with the described phase modulation thereof.

Taking into account the phase and amplitude modulation of the received signal and neglecting all constant changes in phase angle occurring in the described system, the time waveform of the signal at the output of amplifier chain 60 is:

$$\frac{B}{s} \cos \omega_0 \left( t + \frac{\Delta s}{c} \right) \quad (8)$$

where B is a constant and $\Delta s$ is the change in length of path $s$ from its maximum length attained when element 45 is at point $k$, $\Delta s$ being considered positive when directed towards point $m$. In expression 8, the term $B/s$ is the amplitude of the signal. From expression 8 the signal's instantaneous phase angle (in radians) relative to the reference phase signal $A \cos \omega_0 t$ is $\omega_0 \Delta s/c$, and the maximum phase shift of the received signal is $\omega_0 D/c$ (in radians) or 360 $f_0D/c$ (in degrees). While expression 8 is considered to be the time waveform of the received signal, it can equally well be considered the time waveform of the waves intercepted by the receiver in that those waves are characterized by a Doppler shift in phase the same as the phase shift of the received signal.

The phase modulation of the received signal is determined by applying such signal as a first input to each of two similar demodulator stages 90 and 91 in processing unit 71. Demodulator stage 90 receives a second input from oscillator 50 of the transmitter-energizing signal $A \cos \omega_0 t$. Demodulator 91 is, on the other hand, supplied with a second input of $A \sin \omega_0 t$ obtained by passing the signal $A \cos \omega_0 t$ through a 90° phase shifter 93.

As shown by FIG. 3, demodulator 90 is a ring demodulator in which the fixed phase signal $A \cos \omega_0 t$ is applied through secondary coil 98 of a transformer 99 to a pair of diagonal terminals 100, 101 of a bridge formed by four diodes 102–105 (and associated resistors) connected in a ring. Coupled between the other diagonal terminals 106, 107 of the bridge are two similar capacitors 108, 109 in series. The variable phase received signal is applied to the circuit through a transformer 110 of which the secondary 111 is connected between a center tap 112 for the fixed phase secondary 98 and the junction 113 of the two capacitors. The demodulated signal of the circuit appears across the capacitive branch 108 and 109 of which the lower and upper ends 114 and 115 are connected through preliminary filtering chokes 116 and 117 to, respectively, ground and an output lead 118 for the demodulated signal.

To explain in a simplified manner the operation of demodulator 90, assume that the fixed and variable phase signals are in 0° phase relation when the variable phase voltage at point 112 relative to point 113 is in phase with the fixed phase voltage at point 101 relative to point 100. During the positive half cycle of the two voltages, part of the fixed phase current passes from point 101 through diode 104, downward through capacitor 109 and then through secondary 111 and the lower half of secondary 98 back to point 101. At the same time the variable phase current passes from point 112 through diode 104, downward through capacitor 109 and then through secondary 111 back to point 112. Hence for the positive half cycle, the two currents are in the same direction through capacitor 109 to develop a positive voltage at point 115 relative to point 113. During the negative half-cycle, however, the flow of the fixed phase current is through diode 102 and upward through capacitor 108, whereas the flow of the variable phase current is downward through capacitor 108 and through diode 103, the flow of the two currents through capacitor 108 being in opposite directions to yield little or no net voltage across that capacitor. For 0° phase relation, therefore, the signal on lead 118 is a voltage relative to ground which is positive and of maximum value.

Assume now that the variable phase voltage has shifted to be in 180° phase relation with the fixed phase voltage. During the positive half cycle of the fixed phase voltage, the fixed phase current passes as before through diode 104 and downward through capacitor 109, but the variable phase current passes upward through capacitor 109 and through diode 105, the opposite flows of the two currents through capacitor 109 yielding a net voltage of zero or minimal value across that capacitor. On the other hand, during the negative half cycle, both the fixed phase current and the variable phase current pass through diode 102 and upward through capacitor 108 to develop across the capacitor a voltage which at point 113 is negative relative to point 114 or ground. Thus, the 180° phase relation yields for the signal on lead 118 a voltage relative to ground which is negative and of maximum value.

Next assume that the fixed and variable phase voltage are in 90° or 270° phase relation. The fixed phase voltage creates equal current flows towards point 113 through capacitor 109 and capacitor 108 during, respectively, the positive half cycle and the negative half cycle of that voltage. The variable phase voltage during its positive half cycle creates equal current flows towards point 113 through diode 102 and capacitor 108 and, also, through diode 104 and capacitor 109. Moreover, such voltage during its negative half cycle creates equal current flows away from point 113 through capacitor 108 and diode 103 and, also, through capacitor 109 and diode 105. Hence for 0° or 270° phase relation, the signal on lead 118 has voltage relative to ground.

In addition to the described current flows, the demodulator 90 has a detecting action provided by the capacitors 108, 109 and the resistors associated with the diodes. The output of circuit 90 is, therefore, a demodulated signal 120 which varies in amplitude and is positive maximum, zero, negative maximum and zero when the phase relation of the variable phase signal to the fixed phase signal $A \cos \omega_0 t$ is, respectively, 0°, 90°, 180° and 270°. Because the variable phase signal is characterized by amplitude modulation represented by the term $B/s$ in expression 8, the signal 121 has a variation in peak amplitude corresponding to that amplitude modulation.

The demodulator 91 is similar in strucutre and operation to the demodulator 90 except that the fixed-phase signal $A \sin \omega_0 t$ for circuit 91 is shifted 90° from the fixed-phase signal $A \cos \omega_0 t$ for circuit 90. Because of that 90° phase shift, the amplitude of the demodulated signal 121 from circuit 91 is zero, positive maximum, zero and negative maximum when the amplitude of the signal 120 from circuit 90 is, respectively, positive maximum, zero negative maximum and zero. Like signal 120, the signal 121 has a variation in peak amplitude corresponding to the term $B/s$ in expression 8, the amplitude variations of the two signals being in step with each other.

From the outputs of demodulators 90 and 91, the demodulated signals 120 and 121 are passed through respective low pass filters 124 and 125 which reject residual high frequency components left over from the demodulating action. After filtering, the demodulated signals 120 and 121 are applied to, respectively, the vertical beam deflection electrodes 130 and the horizontal beam deflection electrodes 131 of a cathode ray tube 132 of which the electron beam generates a luminous spot 133 on the phosphor screen 134 of the tube. For convenience, there is shown only one of the two vertical deflection electrodes 130 and only one of the two horizontal deflection electrodes 131. The center of screen 134 has a cross hair mark 135 in order that the position of spot 133 relative to that center may be better seen.

The demodulated signals on electrodes 130 and 131 deflect spot 133 in a manner related as follows to the position of receiver 45. When the receiver is at point $k$, the amplitude of the received signal is of minimum value, and such signal is in 0° phase relation and in 90° phase relation with, respectively, the signal $A \cos w_0 t$ and the signal $A \sin w_0 t$. Accordingly, demodulated signal 120 is at the positive peak of amplitude obtainable from the minimum amplitude of the received signal, demodulated signal 121 is of zero amplitudes, and spot 133 is positioned as shown at an initial position 139. When receiver 45 moves from point $k$ towards point $l$ in an amount which shortens path $s$ by one-quarter wavelength of the waves received over that path, the resulting phase shift in the received signal causes signal 120 to decrease to zero and signal 121 to rise to a positive peak, wherefore spot 133 is angularly shifted clockwise through one quadrant to point 140. Because the described receiver movement results in an increase in the amplitude of the received signal, the path followed by spot 133 from its original position 139 to point 140 is a portion of a spiral insead of an arc of a circle. If desired, however (as when the movement of the electron beam of tube 132 is being detected electronically rather than visually), the amplitude modulation of the received signal may be removed by limiting, and spot 133 will then follow a circular path.

When receiver 45 moves further to shorten path $s$ by another quarter wavelength, the consequent phase shift of the received signal causes signal 121 to go to zero amplitude and signal 120 to assume a negative peak in amplitude so as to bring spot 133 to point 141. The two subsequent quarter wavelength shortenings of path $s$ by the receiver movement deflect spot 133 to positions 142 and 143, respectively. Therefore, a shortening of path $s$ by one full wavelength of the emitted acoustic waves produces angular deflection of spot 133 through one 360° turn of the shown spiral path 145.

From what has been said, it is evident that, as receiver 45 continues to move towards point $m$, spot 133 continues to move clockwise to generate more turns of spiral 145 until the receiver reaches point $m$. At that point, the received waves are of maximum amplitude and the maximum leading phase shift of the received signal has been attained, so spot 133 is at the outer end 146 of the spiral. When spot 133 is at that end, the total number of angular degrees T swept out by the spot around mark 135 is equal to 360° multiplied by the integral or non-integral number of wavelengths contained in the diameter D of path 75, or, in other words, is equal to $360 f_0 D/c$. Hence, the value of $c$ is readily determinable by dividing $360 f_0 D/c$ by T.

The determination of $c$ in such manner is advantageous because it is highly precise. That is, both the diameter D of path 75 and the oscillator frequency $f_0$ may be kept constant to better than one part in 10,000. Moreover, when spot 133 is at end point 146 of a spiral 145 having, say 50 turns, the angular position of the spot relative to mark 135 is ordinarily determinable to one part in 10,000 of the total angular sweep T of the spot. Hence, taking into account those factors and all other factors of which the variations from a nominal value affect the accuracy with which the value of $c$ may be computed, that value can with care be readily ascertained to one part in 5,000 for absolute sound velocity and to a change of 1.0 ft./sec. for relative sound velocity.

As receiver 45 moves past point $m$, the resulting phase shift of the received signal back towards reference phase causes the spot 133 to move counterclockwise from outer end 146 so as to unwind the spiral previously traced out thereby. That unwinding movement continues until receiver 45 returns to point $k$ and spot 133 returns to inner end point 139. One full revolution of receiver 45 thus corresponds to one complete winding and unwinding of spiral 145.

As receiver 45 moves through successive revolutions, the spot 133 traces out successive spirals which are first wound and then unwound by the spot movement. In each of those spirals, the total angular sweep T of the spot is, as described, a function of the sound velocity $c$ at the depth then probed by instrument 10, and such depth is determinable by multiplying the number of spirals formed up to that time by the distance (determined by calibration) through which the instrument sinks during one revolution of propeller 35. The over-all movement of spot 133, therefore, is representative of the velocity profile with depth of the ocean over the path of sinking of instrument 10. To provide a permanent record of such over-all movement, the traveling spot may be photographed during the sinking of the instrument by a high speed motion picture camera 160. Subsequently, the profile of sound velocity as a function of depth may be plotted from the information recorded on the camera film.

As a specific example of a system according to the invention, the sinker body 30 has a length of 18″ from its front end to its rear end opening for the propeller shaft, the weight of the body being 30 pounds in air. Propeller 35 has a diameter of 6″, the diameter of the path 75 for receiver 45 being slightly less. The minimum separation between receiver 45 and 46 is not critical but may conveniently be 2″. Transmitter 46 is a series tuned barium titanate cylinder ⅛″ in diameter and cut to resonate in its length mode at 500 kc.p.s. Receiver 45 is a parallel tuned barium titanate cylinder 0.228″ in diameter and designed to operate in the radial mode at a frequency of 500 kc.p.s. Oscillator 50 is a 500 kc.p.s. bridge oscillator. Demodulator circuit 90 employs a 2 kilohm isolating resistor for the input to transformer 99, IN638 diodes, 10 ohm resistors in series with these diodes, 0.01 microfarad capacitors and 900 microhenry chokes. Demodulator circuit 91 is similar. The phase shifter circuit 93 is a conventional bridge circuit comprised of resistive and capacitive arms alternating around the bridge, the input and output leads for the circuit being connected to conjugate diagonal terminals of the bridge. Each of filters 124 and 125 is an M-derived filter having a nominal cut-off of 100 kc.p.s. and high attenuation at 500 kc.p.s. Oscilloscope 132 is a Dumont 304a oscilloscope.

The above described embodiments being exemplary only, it is to be understood that additions thereto, modifications thereof and omissions therefrom can be made without departing from the spirit of the invention, and that the invention comprehends embodiments differing in form and/or detail from those specifically described. For example, units 71 and 17 of the FIG. 3 system may be utilized apart from unit 70 to determine the modulation index $m$ of a sinusoidally or non-sinusoidally angularly modulated signal $C \cos[\omega_0 t + mg(\omega_1, t)]$ by imparting to such signal some amplitude modulation $D(\omega_1 t)$ which is properly phased in relation to the angular modulation to produce a winding-unwinding spiral sweep of spot 133, the total angle swept out by the spot in one angular direction over one spiral being equal to twice the modulation index $m$. Further, since the angular movement of spot 133 is directly proportional to the change of distance between the transmitter and the receiver when the emitted waves have a velocity of propagation through the medium which remains constant, under such constant velocity conditions the described system may be utilized to determine such change in distance whether such change is cyclical or non-cyclical and whether the propagated waves are acoustic waves in a gaseous or liquid medium or are electromagnetic waves. Evidently, instead of relying upon $f_0$ remaining constant during a determination, the value of $f_0$ (although not shown in FIG. 3) entering unit 17) may be monitored at the output unit 17 for the purpose of correcting the determined value in accordance with any change detected in $f_0$. While in the shown FIG. 3, the transmitter is stationary and the receiver is moving, alternatively, the receiver may be stationary and the transmitter moving or both may be moving.

Accordingly, the invention is not to be considered as limited save as is consonant with the recitals of the following claims.

We claim:

1. A system for determining a parameter of a fluid medium comprising, acoustic transmitter means immersible in said medium, acoustic receiver means immersible in said medium away from said transmitter means to receive from said transmitter means an acoustic wave propagated through said medium over a path of variable length, means to cyclically vary said path length to thereby impart to said wave a Doppler shift sensed by said receiver means, and means responsive to said sensed Doppler shift to provide an output which is a function of the velocity of propagation in said medium of said wave.

2. A system as in claim 1 in which said means to cyclically vary said path length comprises, support means for one of said acoustic means, and mounting means for the other of said acoustic means and by which said other acoustic means is angularly moved relative to said support means around an axis in an orbital path variably spaced from point to point from said one means.

3. A system as in claim 2 in which said one acoustic means is spaced from said axis by a distance greater than the radius of said orbital path.

4. A system as in claim 2 in which said one acoustic means is in the plane normal to said axis and containing said orbital path.

5. A system as in claim 2 in which said mounting means is rotatable through a full circle and is operably rotated through a plurality of full revolutions, said orbital path being, accordingly, a circular path.

6. A system as in claim 2 in which said one acoustic means is said transmitter means and said other acoustic means is said receiver means.

7. A system for determining a parameter of a fluid medium comprising, first and second spaced electro-acoustic transducer means which are transmitter means and receiver means, respectively, and which are immersible in wave-coupled relation in said medium to provide for reception and conversion into an electric signal by said receiver means of an acoustic wave propagated through said medium from said transmitter means, means to effect in said medium a cyclical variation in spacing occurring between said first and second means and productive of a Doppler shift in said wave and a consequent change in said signal, and means responsive to said signal change to provide an output which is a function of said Doppler shift.

8. A system operable with a fluid medium comprising, electroacoustic transmitter means immersible in such medium and responsive to an electric energizing signal of reference phase to produce an acoustic wave propagated through said medium, electroacoustic receiver means immersible in said medium away from said transmitter means to receive said wave by a path through said medium and to convert said wave into a received electric signal, means to produce a cylical variation in spacing between said transmitter means and sound receiver means so as to render said path operably characterized by a cyclical variation in length productive of a Doppler shift in said wave and of a consequent shift in the phase of said received signal, phase-modifying means responsive to said energizing signal to provide two differently phased signals of which each is of fixed phase relative to said reference phase, phase-sensitive demodulator means responsive to said received signal and to said two fixed-phase signals to provide two demodulated signals of which each corresponds to a respective one of said fixed-phase signals and has a variation in amplitude representative of a phase shift of said received signal relative to the fixed-phase signal corresponding to that demodulated signal, and means responsive to said demodulated signals to provide an output representative of said Doppler shift.

9. A system as in claim 8 further comprising, means to render said variation in path length of a cyclical character which is productive of phase modulation of said received signal.

10. A system operable with a fluid medium comprising, electroacoustic transmitter means immersible in such medium and responsive to an electric energizing signal of reference phase to produce an acoustic wave propagated through said medium, electroacoustic receiver means immersible in said medium away from said transmitter means to receive said wave by a path through said medium and to convert said wave into a received electric signal, means to cylically vary the length of said path so as to phase modulate said received signal relative to said reference phase, means responsive to said energizing signal and to said received signal to produce two demodulated signals of which each is characterized by a variation in amplitude representative of a phase shift of said received signal relative to a respective one of two phase values 90° apart and fixed relative to said reference phase, and cathode ray means conjointly responsive to said two demodulated signals to provide an electron beam characterized by a cyclical bidirectional angular movement representative of the phase modulation of said received signal.

11. A system as in claim 10 in which said path length is cyclically varied between maximum and minimum values so as to render said received signal amplitude modulated between corresponding maximum and minimum values as a function of the length of said path, and means by which said amplitude modulation is transmitted through said demodulated signals to said cathode ray means to render said movement of said beam in the form of a winding-unwinding spiral.

12. A system for determining a parameter of a liquid medium comprising, probe means sinkable in said medium, electroacoustic transmitter means and electroacoustic receiver means carried by said probe means and having therebetween a variable length path through said medium, said receiver means being responsive to an acoustic wave transmitted through said path from said transmitter to convert said wave into a received electric signal, means to cyclically vary said path length to thereby impart a Doppler shift to said wave and a consequent angular modulation to said signal, means providing a communication link between said probe means and the surface of said medium, and means responsive through said link to said angular modulation to provide an output representative of said Doppler shift.

13. A system for determining a parameter of a liquid medium comprising, probe means sinkable in said medium, electroacoustic transmitter means and electroacoustic receiver means carried by said probe means and having therebetween a variable length path through said medium, said receiver means being responsive to an acoustic wave transmitted through said path from said transmitter means to convert said wave into a received electric signal, means to cyclically vary said path length to thereby impart a Doppler shift to said wave and a consequent phase modulation to said signal, means providing a communication link between said probe means and the surface of said medium, and cathode ray means responsive through said link to said phase modulation to provide an electron beam characterized by a cyclical bidirectional angular movement representative of said Doppler shift.

14. A system for determining a parameter of a liquid medium comprising, probe means sinkable in said medium, electroacoustic transmitter and receiver means, means carried in variably spaced relation by said probe means, said transmitter means being transmissive of acoustic waves passing through said medium to said receiver means, means to cyclically vary the spacing between said two electroacoustic means so as to render the signal produced by said receiver means in response to said waves a cyclically modulated signal of which the magnitude of the cyclical modulation is a function of the velocity of sound in said medium and the repetition rate of said cyclical modulation is a function of the rate of sinking of said probe means in said medium, means providing a communication link between said probe means and the surface of said medium, and means responsive through said communication link to said cyclical modulation of said signal to provide an output representative of the velocity profile with depth of said medium.

15. A sounding instrument for a liquid medium comprising, probe means sinkable in said medium, vane means rotatably mounted on said probe means and adapted to rotate during sinking of said probe means in said medium, first electroacoustic transducer means rotatable with said vane means to follow a circular path, second electroacoustic transducer means on said probe means in spaced relation from said path, one and the other of said two transducer means being, respectively, transmitter means and receiver means, and electric circuit means by which said two transducer means are energizable to provide for reception by said receiver means of an acoustic wave propagated through said medium from said transmitter means.

16. A sounding instrument for a liquid medium comprising, probe means sinkable in said medium, first and second spaced electroacoustic transducer means carried by said probe means to be spaced by a variable length path through said medium, one and the other of said two transducer means being respectively, transmitter means and receiver means, means productive during the sinking of said probe means in said medium of a cyclical variation in the length of said path, and electric circuit means by which said two transducer means are energizable to provide for reception by said receiver means of a wave propagated through said medium from said transmitter means.

17. Signal responsive apparatus comprising, input means for a signal characterized by phase modulation relative to a reference frequency and phase, input means for first and second differently phased signals each having a fixed phase relative to said reference phase, demodulator means responsive to such three signals to provide two demodulated signals each corresponding to a respective one of said fixed-phase signals and each having a variation in amplitude representative of a phase shift of said modulated signal relative to the fixed-phase signal corresponding to that output, and means responsive to said demodulated signals to provide an output representative of the maximum phase shift of said modulated signal.

18. Apparatus as in claim 17 in which said means responsive to said demodulated signals comprises cathode ray means having first and second deflection electrode means adapted to separately deflect in different directions an electron beam provided by said cathode ray means, said first and second electrode means being each responsive to a respective one of said demodulated signals to conjointly impart to said beam a cyclical bidirectional angular movement having a magnitude which is representative of said maximum phase shift.

19. Apparatus as in claim 18 in which said angularly modulated signal is characterized by amplitude modulation which is transmitted through said demodulated signals to said two deflection electrode means to render said movement of said beam in the form of a winding-unwinding spiral.

References Cited

UNITED STATES PATENTS

| | | | |
|---|---|---|---|
| 2,683,855 | 7/1954 | Blitz | 343—17.7 |
| 2,997,689 | 8/1961 | Johnson et al. | 340—3 |
| 3,142,059 | 7/1964 | Williston | 343—17.7 |
| 3,273,111 | 9/1966 | Parenti | 340—3 |
| 3,283,562 | 11/1966 | Heisig et al. | 73—24 |

FOREIGN PATENTS

| | | |
|---|---|---|
| 798,323 | 7/1958 | Great Britain. |

OTHER REFERENCES

"Applying the Doppler Effect to Direction Finder Design," an article in Electronic Industries & Tele-Tech, January 1957, pp. 75–77 and 147.

RICHARD C. QUEISSER, *Primary Examiner.*

C. I. McCLELLAND, *Assistant Examiner.*